US006941362B2

(12) United States Patent
Barkai et al.

(10) Patent No.: US 6,941,362 B2
(45) Date of Patent: Sep. 6, 2005

(54) ROOT CAUSE ANALYSIS IN A DISTRIBUTED NETWORK MANAGEMENT ARCHITECTURE

(75) Inventors: Sharon Barkai, Shoham (IL); Ariel Noy, Herzliya (IL); Yoel Shkolnisky, Or-Yehuda (IL)

(73) Assignee: Sheer Networks Inc., Sunnyvale, CA (US)

( * ) Notice: Subject to any disclaimer, the term of this patent is extended or adjusted under 35 U.S.C. 154(b) by 723 days.

(21) Appl. No.: 09/799,637

(22) Filed: Mar. 7, 2001

(65) Prior Publication Data

US 2001/0039577 A1 Nov. 8, 2001

Related U.S. Application Data

(60) Provisional application No. 60/200,507, filed on Apr. 28, 2000, provisional application No. 60/222,662, filed on Aug. 3, 2000, and provisional application No. 60/222,729, filed on Aug. 3, 2000.

(51) Int. Cl.[7] ............................................. G06F 15/173
(52) U.S. Cl. ...................... 709/223; 709/224; 709/225; 719/318
(58) Field of Search ................................ 709/223, 224, 709/225; 719/318

(56) References Cited

U.S. PATENT DOCUMENTS

| | | | |
|---|---|---|---|
| 5,317,568 A | | 5/1994 | Bixby et al. |
| 5,752,034 A | * | 5/1998 | Srivastava et al. .......... 717/130 |
| 5,758,083 A | | 5/1998 | Singh et al. |
| 5,777,549 A | | 7/1998 | Arrowsmith et al. |
| 5,864,662 A | | 1/1999 | Brownmiller et al. |
| 5,928,325 A | | 7/1999 | Shaughnessy et al. |
| 5,961,594 A | | 10/1999 | Bouvier et al. |
| 5,978,845 A | | 11/1999 | Reisacher |
| 6,032,183 A | | 2/2000 | Chen et al. |
| 6,035,331 A | | 3/2000 | Soga et al. |
| 6,047,320 A | | 4/2000 | Tezuka et al. |
| 6,061,723 A | * | 5/2000 | Walker et al. ............... 709/224 |
| 6,088,044 A | * | 7/2000 | Kwok et al. ................. 345/505 |
| 6,101,541 A | | 8/2000 | Ellesson et al. |
| 6,237,034 B1 | | 5/2001 | Fulford |
| 6,247,052 B1 | | 6/2001 | Huang et al. |
| 6,247,056 B1 | | 6/2001 | Chou et al. |
| 6,271,845 B1 | * | 8/2001 | Richardson .................. 345/764 |
| 6,332,195 B1 | * | 12/2001 | Green et al. ................. 713/201 |
| 6,484,200 B1 | * | 11/2002 | Angal et al. ................. 709/224 |

FOREIGN PATENT DOCUMENTS

WO     WO 99 23784 A2     5/1999

OTHER PUBLICATIONS

Kerschberg L. et al, "Knowledge and Data Engineering of a Telecommunications Network", International Conf. on the Entity–Relationship Approach, Amsterdam, NL, 1991, pp. 255–269.

* cited by examiner

*Primary Examiner*—William A. Cuchlinski, Jr.
*Assistant Examiner*—Thanh T. Nguyen
(74) *Attorney, Agent, or Firm*—Alphapatent Associates Ltd.; Daniel J. Swirsky

(57) ABSTRACT

A method of determining the root cause of an event in a computer network having a distributed network management architecture including detecting an event at at least one device component (DC) in the network, for each source DC at which an event is detected, finding a data path within the network from the source DC's underlying network element to that of its acquaintance DC where present, identifying as the root cause any of the source DC and the subject DCs in the data path that have detected an event and either do not have an acquaintance or do not have a valid operational state with respect to its acquaintance whereas all other DCs along the data path at lower network layers than the source or subject DC have valid operational states with respect to their acquaintances.

11 Claims, 6 Drawing Sheets

ROOT CAUSE ANALYSIS IN A DISTRIBUTED NETWORK MANAGEMENT ARCHITECTURE

CROSS-REFERENCE TO RELATED APPLICATIONS

This application is related to and claims priority from U.S. Provisional Patent Application No. 60/200,507 entitled "AUTONOMOUS AGENT ARCHITECTURE," filed Apr. 28, 2000, U.S. Provisional Patent Application No. 60/222,729 entitled "LARGE-SCALE NETWORK MODELING USING DISTRIBUTED AUTONOMOUS NETWORK ELEMENTS AGENTS," filed Aug. 3, 2000, and U.S. Provisional Patent Application No. 60/222,662 entitled "FAULT ANALYSIS USING DC MODEL," filed Aug. 3, 2000, all incorporated herein by reference in their entirety.

FIELD OF THE INVENTION

The present invention relates to computer network management in general, and more particularly to root cause analysis in a distributed network management architecture.

BACKGROUND OF THE INVENTION

Classic large-scale computer network architectures having hundreds or thousands of network elements, such as bridges, routers, and switches, are typically managed by a single, centralized network management server, which, by itself or possibly with the help of distributed data acquisition units, gathers information received from the network elements, through techniques such as polling or event trapping, in support of performing centralized functions such as determining the topology or operational status of the entire network or the root cause of network faults. Such centralized, hierarchical systems in which raw or formatted information is processed at a master server ultimately suffer from exhaustion of computation resources and poor response times. A necessary requirement of such centralized network management architectures is that the network management server "see" the entire network and thus be able to receive information from or regarding every element on the network and manage every such element as necessary. Other network management solutions that partition a network into multiple domains, with each domain being separately managed by a central server, do not offer a clear way of integrating cross-domain and end-to-end information, and are therefore not viewed as a full solution, or transform into a multi-hierarchy, centralized bottleneck.

Centralized network management systems suffer particularly when dealing with network surveillance and provisioning. In the event of a network fault, such as if a link between network elements falls, the fault would typically be detected by a polling unit which would then report the fault to the network management server which would determine the root cause of the fault, those network elements that are affected by the fault, and a course of action. As the number of faults increases, the increasing complexity and load of the required computation would eventually result in a failure of the central server and in faults not being handled. End-to-end provisioning and configuration requests that are carried out centrally would likewise suffer from increased multi-element multi-layer computation load and complexity. This problem is compounded in partitioned systems where part of the network suffers, as each centralized server does not see the entire network, which may be critical in handling cross-partition faults or provisioning.

Hence, computer network architectures that employ centralized network management are not easily scalable. Thus, as the number and complexity of network elements increases, and as provisioning procedures grow increasingly complex as the network diversifies, the central network management server will ultimately fail as its capacity to receive and process information from all network elements is exceeded.

SUMMARY OF THE INVENTION

The present invention seeks to provide a method for root cause analysis in a large-scale network management architecture using distributed autonomous agents. The distributed network management architecture includes a plurality of decentralized network management units, where each network management unit sees and is responsible for only a portion of the overall network. A software and/or hardware "agent" is defined for each network element, with each decentralized network management unit hosting those agents that correspond to the portion of the network for which the network management unit is responsible. Each agent in turn comprises a plurality of device components (DCs), with each DC modeling one or more physical and/or logical aspects of the /network element, typically with each DC bound and scoped to cover functionality which is within a single network layer. Moreover, the set of DCs comprising the agent, form published, well-defined, and addressable interfaces of each agent, which may then be easily made known and addressable to other agents.

There is thus provided in accordance with a preferred embodiment of the present invention in a computer network including a plurality of network elements and a network management architecture including a plurality of agents, each of the agents corresponding to a different one of the network elements, and a plurality of device components (DC), each of the device components modeling at least one aspect of one of the network elements, the aspect being either of a physical and a functional characteristic of the network element, where each of the agents includes a plurality of the device components, and where at least of the two device components within at least one of the agents are logically interconnected, each logical interconnection corresponding to either of a physical and a functional interconnection found within or between any of the network elements, a method of determining the root cause of an event in the distributed network management architecture, the method including the steps of, detecting an event at at least one DC in the network, for each DC at which an event is detected, the DC now referred to as a source DC, if the source DC does not have an acquaintance DC, determining the root cause of the event to be within the source DCs area of responsibility, if the source DC does have an acquaintance DC, finding a data path within the network from the source DC's underlying network element to the acquaintance DC's underlying network element, identifying those DCs whose area of responsibility lay along the data path, for each DC in the data path, now referred to as a subject DC, if an event is detected at the subject DC, if the subject DC has an acquaintance DC, if the subject DC does not have a valid operational state with respect to its acquaintance DC, if all other DCs along the data path at lower network layers than the subject DC have valid operational states with respect to their acquaintance DCs, determining the root cause of the event to be within the area of responsibility of the subject DC, if the subject DC has a valid operational state with respect to its acquaintance DC, if all other DCs along the data path at lower network layers than the subject DC have valid operational states with respect to their acquaintance DCs, determining the root cause of the event to be within the area of responsibility of the source DC, and if the subject DC does not have an acquaintance DC, determining the root cause of the event to be within the area of responsibility of the subject DC.

Further in accordance with a preferred embodiment of the present invention the finding a data path step includes traversing only those network elements at or below the network layer of the source DC.

There is also provided in accordance with a preferred embodiment of the present invention a method of determining the root cause of an event in a computer network having a distributed network management architecture, the method including the steps of, detecting an event at at least one device component (DC) in the network, for each DC at which an event is detected, the DC now referred to as a source DC, if the source DC does not have an acquaintance DC, determining the root cause of the event to be within the source DCs area of responsibility, if the source DC does have an acquaintance DC, finding a data path within the network from the source DC's underlying network element to the acquaintance DC's underlying network element, identifying those DCs whose area of responsibility lay along the data path, for each DC in the data path, now referred to as a subject DC, if an event is detected at the subject DC, if the subject DC has an acquaintance DC, if the subject DC does not have a valid operational state with respect to its acquaintance DC, if all other DCs along the data path at lower network layers than the subject DC have valid operational states with respect to their acquaintance DCs, determining the root cause of the event to be within the area of responsibility of the subject DC, if the subject DC has a valid operational state with respect to its acquaintance DC, if all other DCs along the data path at lower network layers than the subject DC have valid operational states with respect to their acquaintance DCs, determining the root cause of the event to be within the area of responsibility of the source DC, and if the subject DC does not have an acquaintance DC, determining the root cause of the event to be within the area of responsibility of the subject DC.

Still further in accordance with a preferred embodiment of the present invention the finding a data path step includes traversing only those network elements at or below the network layer of the source DC.

There is additionally provided in accordance with a preferred embodiment of the present invention in a computer network including a plurality of network elements and a network management architecture including a plurality of agents, each of the agents corresponding to a different one of the network elements, and a plurality of device components (DC), each of the device components modeling at least one aspect of one of the network elements, the aspect being either of a physical and a functional characteristic of the network element, where each of the agents includes a plurality of the device components, and where at least of the two device components within at least one of the agents are logically interconnected, each logical interconnection corresponding to either of a physical and a functional interconnection found within or between any of the network elements, a method of identifying network elements that are affected by a root cause event in the distributed network management architecture, the method including the steps of; identifying at least one DC in whose area of responsibility a root cause event occurred, flagging all of the DCs as "not affected" by the root cause event, flagging the DC in whose area of responsibility a root cause event occurred as a "propagation candidate", initiating a message specific to the root cause event, for each DC flagged as a propagation candidate, flagging the DC flagged as a propagation candidate as an "affected candidate", if the DC flagged as an affected candidate should ignore the message, flagging the DC flagged as an affected candidate as "not affected", if the DC flagged as an affected candidate is required to propagate the message or a transformation thereof to at least one neighbor DC, propagating the message or a transformation thereof to the neighbor DCs, and flagging the neighbor DCs as "propagation candidates", where the DCs flagged as an affected candidate represent those network elements that are affected by the root cause event.

Further in accordance with a preferred embodiment of the present invention the for each DC steps are repeated for all DCs flagged as propagation candidates during a plurality of iterations.

Still further in accordance with a preferred embodiment of the present invention the for each DC steps further includes any of the DCs performing an action responsive to the message.

There is also provided in accordance with a preferred embodiment of the present invention a method of identifying network elements that are affected by a root cause event in a computer network having a distributed network management architecture, the method including the steps of, identifying at least one device component (DC) in whose area of responsibility a root cause event occurred, flagging all of the DCs as "not affected" by the root cause event, flagging the DC in whose area of responsibility a root cause event occurred as a "propagation candidate", initiating a message specific to the root cause event, for each DC flagged as a propagation candidate, flagging the DC flagged as a propagation candidate as an "affected candidate", if the DC flagged as an affected candidate should ignore the message, flagging the DC flagged as an affected candidate as "not affected", if the DC flagged as an affected candidate is required to propagate the message or a transformation thereof to at least one neighbor DC, propagating the message or a transformation thereof to the neighbor DCs, and flagging the neighbor DCs as "propagation candidates", where the DCs flagged as an affected candidate represent those network elements that are affected by the root cause event.

Further in accordance with a preferred embodiment of the present invention the for each DC steps are repeated for all DCs flagged as propagation candidates during a plurality of iterations.

Still further in accordance with a preferred embodiment of the present invention the for each DC steps further includes any of the DCs performing an action responsive to the message.

It is appreciated throughout the specification and claims that the term "flagging" may be understood to be any physical and/or logical act of placeholding, tagging, or identification known in the art that may be applied to physical and/or logical elements operated upon by the present invention.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
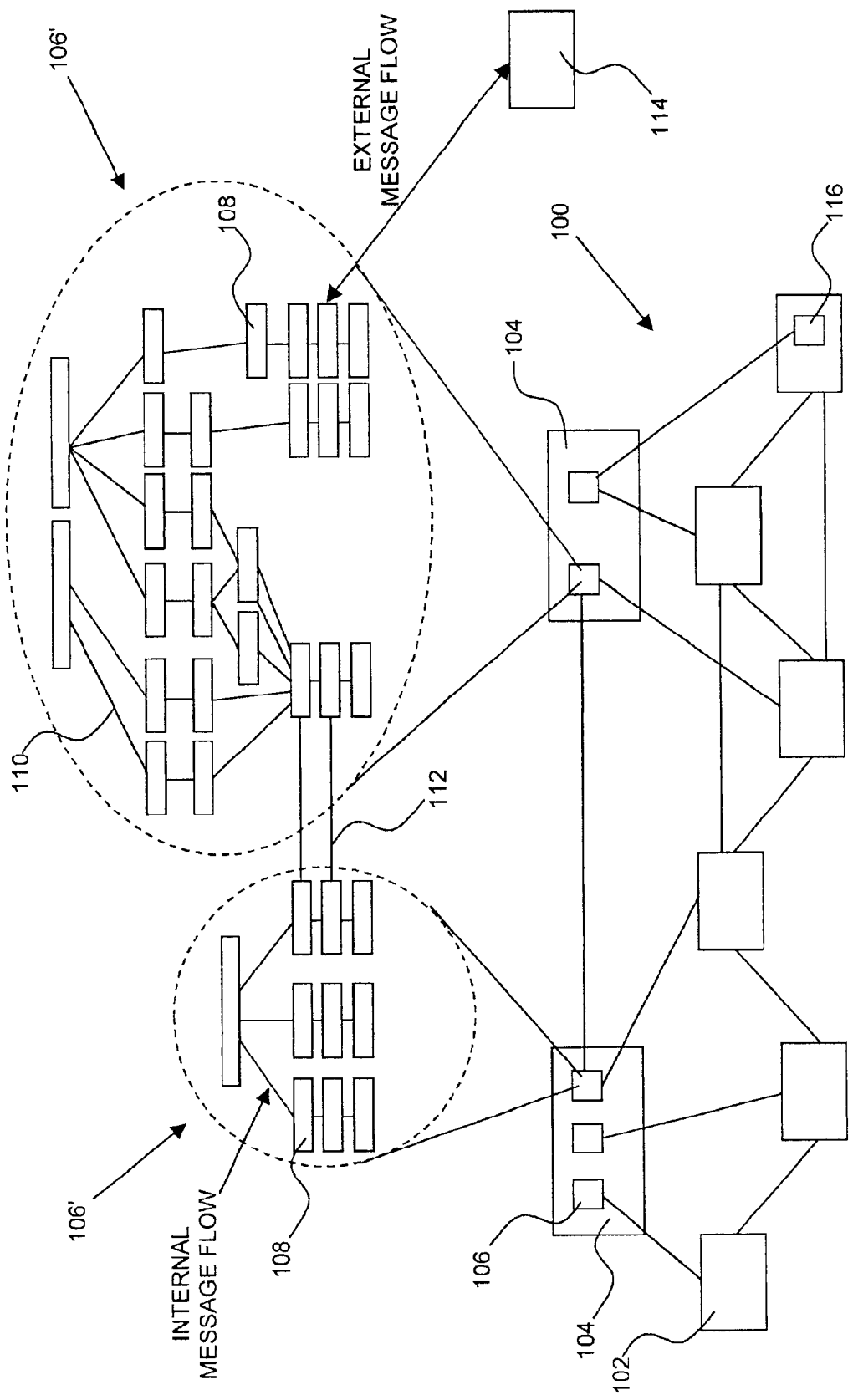
FIG. 1 is a simplified conceptual illustration of a large-scale network management system using distributed autonomous agents, useful in understanding the present invention.

Reference is now made to FIG. 1 which is a simplified conceptual illustration of a large-scale network management system using distributed autonomous agents, useful in understanding the present invention. In the system of FIG. 1 a network, generally designated 100, comprises a plurality of network elements 102, and is managed by one or more decentralized network management units 104, where each network management unit 104 sees and is responsible for only a portion of the overall network 100. A proxy or hardware embedded "agent" 106 is defined for each network element 102, with each decentralized network management unit 104 hosting those agents 106 that correspond to the portion of the network 100 for which the network management unit 104 is responsible. (Various agents 106 are shown in expanded views in dashed lines indicated by reference numerals 106'.)

Each agent 106 in turn comprises a plurality of device components (DCs) 108, with each DC 108 modeling one or more physical and/or logical aspects of the device 102, typically within a single network layer. For example, a DC 108 may represent an Ethernet port component, a 1483 encapsulation component, or routing functionality within a network element incorporating such functionality. DCs 108 may maintain any information concerning certain functions or aspects of the specific network element. This information may be static, dynamic, or any combination thereof DCs 108 may communicate directly with other DCs 108, and two DCs 108 that communicate with each other are referred to as "neighbors." DCs 108 are typically arranged in a functional hierarchy within the agent 106, with a higher-level DC acting as the "parent" to one or more lower-level DC "children" with which it communicates, such as is shown at reference numeral 110. DCs that communicate with other DCs that are of the same type or perform the same function are referred to as "acquaintances," such as is shown at reference numeral 112. DCs may become "acquainted" by manually defining relationships between DCs or by having DCs send messages in order to discover topologically adjacent DCs. A DC 108 may be acquainted with another DC 108 within the same agent 106 or within another agent 106. Each DC 108 preferably uses message passing to independently communicate with any neighbor or adjacent DCs without the need to communicate directly with a centralized network management device.

DCs 108 may send/receive messages to/from neighbor DCs 108, to the network element 102 which the DC 108 models, or an external entity or device 114 (either logical or physical) that is not modeled by an agent or a DC. Information flows between DCs 108 are referred to as "internal" flows, while information flows between DCs 108 and external entities or devices 114 are referred to as "external flows". One example of an internal flow is where a device component detects a fault within its area of responsibility and reports the fault to neighboring DCs to whom such information is useful. One example of an external flow is as the result of a query of all DCs 108 in network 100 by logic external to the DCs 108 and/or the agents 106 for gathering the IP addresses of devices 102 where available. Upon receiving a message, a DC may ignore the message or may react by autonomously changing its physical or logical state and/or that of its corresponding area of functionality within the network device or send a message to itself or to a neighbor DC.

Additionally or alternatively to agents 106 being hosted by decentralized network management units 104, each network element 102 may itself host its agent and/or another device's autonomous agent, such as is shown at reference numeral 116. Thus, were each network element 102 to host its own agent, no decentralized network management units 104 would be required.

Figure 2:
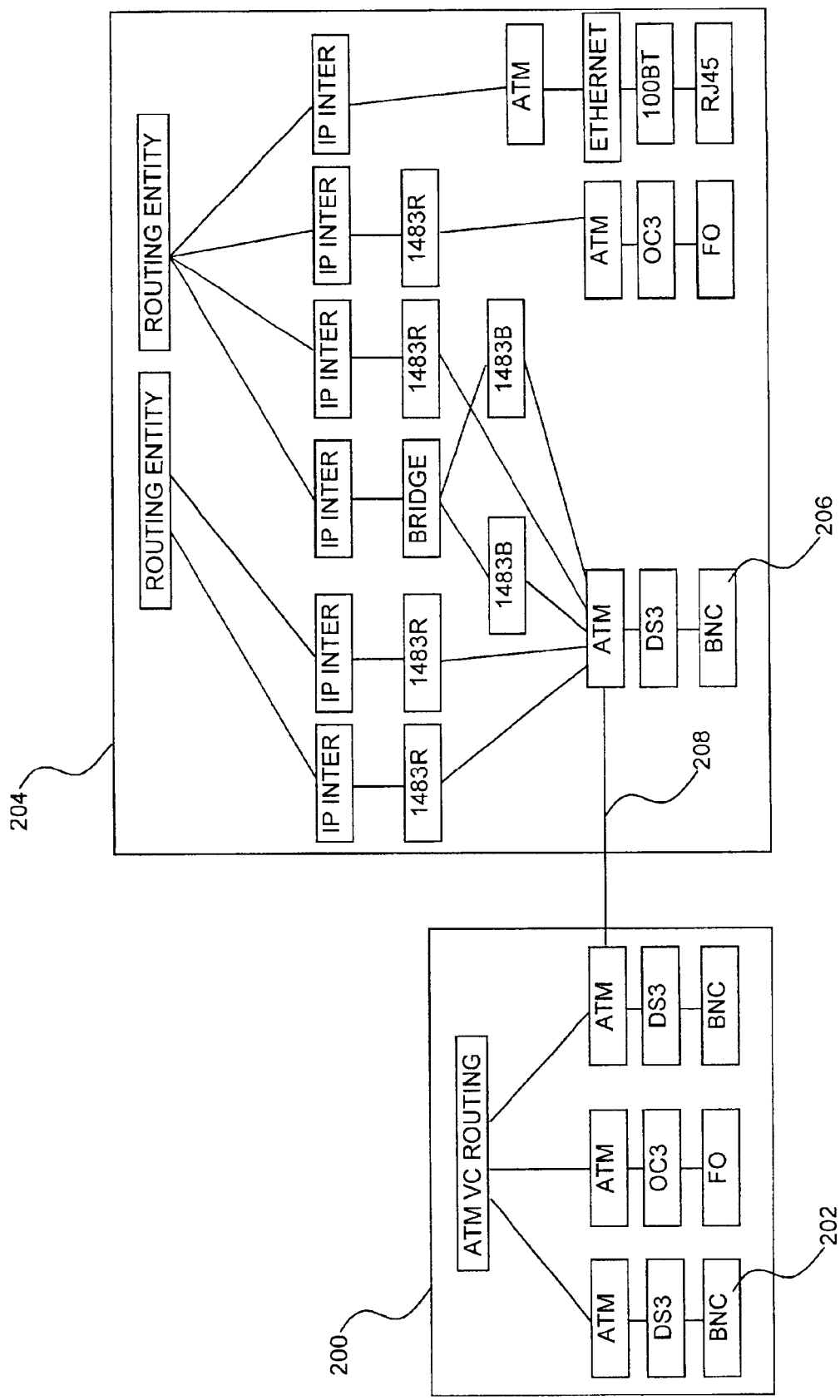
FIG. 2 is a simplified conceptual illustration of an exemplary agent and DC configuration, useful in understanding the present invention.

Reference is now made to FIG. 2 which is a simplified conceptual illustration of an exemplary agent and DC configuration, useful in understanding the present invention. In FIG. 2 an ATM switch having three ATM ports is modeled by an agent 200. Agent 200 in turn includes several DCs 202 as follows: two DCs corresponding to two BNC connectors, one DC corresponding to a fiber optic (FO) connector, two DC parents to the BNC DCs representing DS3 connectivity, one DC parent to the FO connector representing OC3 connectivity, three DCs representing the ATM network layer functionality for each of the three ATM ports, and a DC parent corresponding to the switch's ATM virtual channel (VC) routing functions. Also shown is an agent 204 having multiple DCs 206 corresponding to ATM and Ethernet connections and functionality at various network layers representing bridging, switching, and routing functions, including IP and 1483 interface protocols.

An ATM DC in FIG. 2 may, for example, maintain a list of all the VCs assigned to the ATM port it models, and may monitor the removal of a VC from the port or the allocation of a new VC to the port. An IP interface DC may, for example, contain the IP address of the physical IP interface of the device and subnet mask. Each type of DC may appear in several instances in one or more agents depending on the specific device and its configuration. Thus, in FIG. 2, since the network device represented by agent 200 has three ATM ports, agent 200 has three instances of an ATM-type DC.

The configuration of FIG. 2 may be adapted through continuous modeling to reflect the true state of the network at any given time. DCs and the links between them may be added or removed at runtime to reflect the current state of the network, allowing tracing of the data flows, states and reactions of the network. Changes in the underlying physical network may be dynamically reflected by the model by affecting the DCs and the connections between them in response to network events. For example, if a link is disconnected between two ATM ports in the network, a link 208 between the neighbor ATM DCs in agents 200 and 202 representing network layer 2 adjacency should be removed. When the link is reconnected, link 208 between the two ATM DCs may be restored.

By modeling the network elements in a computer network using interconnected agents through the DCs in them as shown in FIGS. 1 and 2, the network may be fully modeled at both the network element and network function levels. Furthermore, the model may be used to reflect at any given moment the current state of the network, with DCs autonomously supporting fault, configuration, accounting, performance, security, policy, and provisioning functions.

Figure 3:
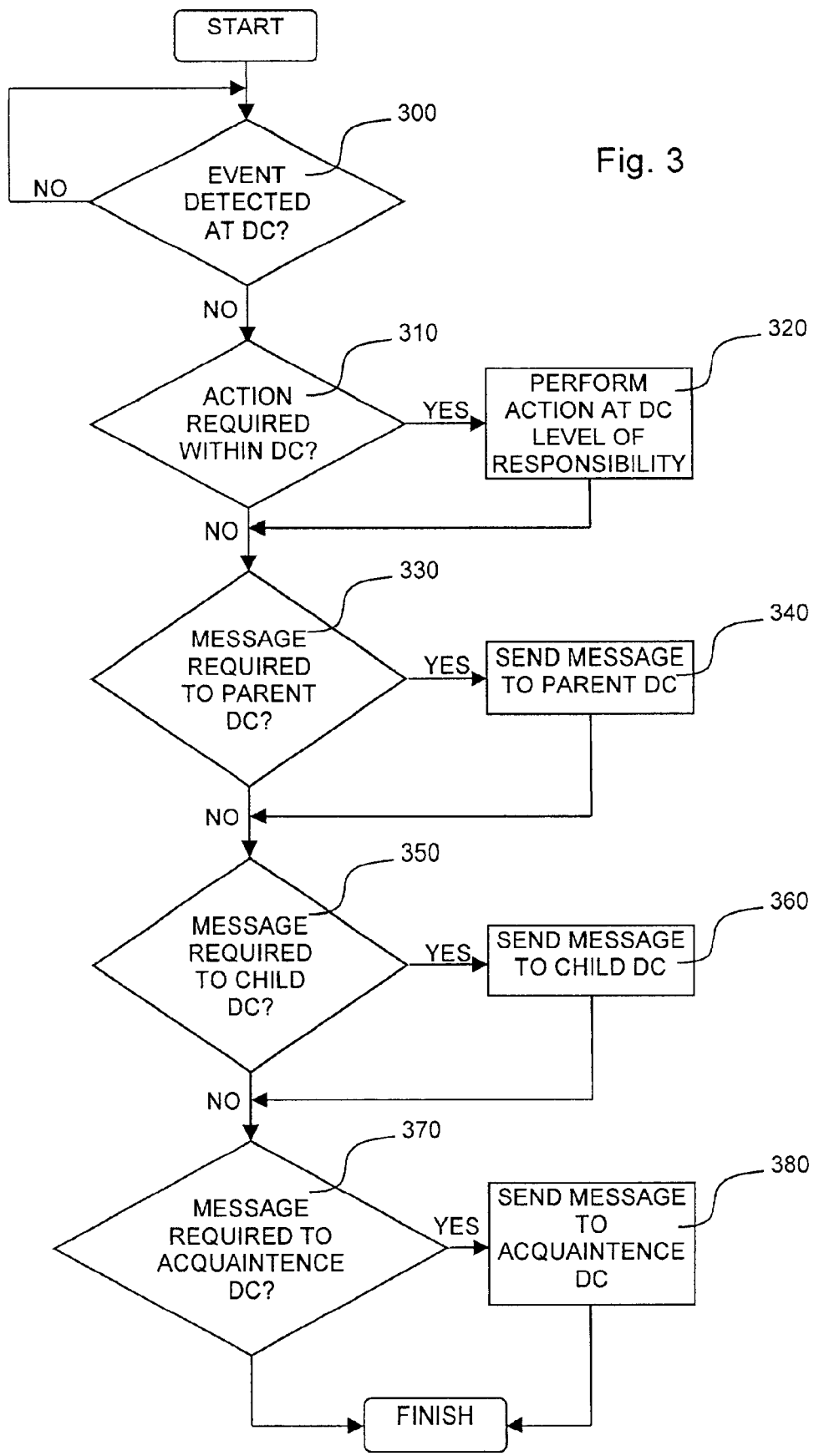
FIG. 3 is a simplified flowchart illustration of an exemplary decision-routing DC framework, useful in understanding the present invention.

Reference is now made to FIG. 3, which is a simplified flowchart illustration of an exemplary decision-routing DC framework, useful in understanding the present invention. In the method of FIG. 3 an event, such as a fault or a provisioning request, is detected at a DC (step 300). The DC then determines if it is to take any action in response to the event within the DC and/or its area of responsibility (step 310), and, if so, performs such action (step 320). The DC then determines if it is to send any messages to a parent DC (step 330), a child DC (step 350), and/or an acquaintance DC (step 370), and sends any required messages (steps 340, 360, and 380).

The concept of events and flows as described hereinabove with reference to FIGS. 1, 2, and 3, may be better understood by way of example. In what is referred to as a system-wide, top-down flow, a request arrives from an external entity and is spread from DC to DC, with each DC performing its independent computations which collectively achieve the external request. For example, the provisioning of a QoS parameter for a specific user class is signaled and synchronized for IP ToS masks between IP DCs of routers and is also carried by the routers' IP-over-ATM-interface DCs into the ATM DCs which signal and synchronize the ATM VBR parameters to the DCs of the ATM switches between the routers. In other words, for configuration of QoS between two IPs, the routers on the path between the two IPs may be configured with consistent ToS parameters. Moreover, the ATM path between every two consecutive routers in the layer 3 path may be configured with consistent VBR parameters. In a bottom-up flow, a network or DC event, including scheduled events, may propagate to other DCs which change their state and/or perform their part in a distributed algorithm. An example of such a flow is in fault detection. For example, an ATM circuit break is signaled by ATM DCs to both ends of the circuit. The signal is then propagated up the stack to IP DCs in routers whose IP-over-ATM-interface is affected by the break. The unreachable IP subnet failure is then correlated with the ATM circuit break point which initiated the flow.

An example of DC discrete message passing that provides multi-layer control signaling for use in end-to-end provisioning and fault isolation may be understood with reference to acquainted same-layer, same-technology DCs (e.g., two layer 2 ATM DCs, two layer 3 IP MPLS DCs, two Layer 5 H323 DCs, etc.) in neighboring agents representing different network elements as defined by that layer's standards. The two DCs may exchange discrete messages regarding configuration parameters, status monitoring, statistics, and accounting parameters of the layer interface as it is implemented in the two elements. Similarly, father-son DCs representing areas of responsibility in the same network element which maps functionality between upper and lower layers or functions as defined in networking standards and in the specific network element specifications (e.g., IP to Ethernet, ATM to DS3, SONET to DWDM, etc.) may exchange discrete messages regarding the way in which configuration parameters of the upper layer relate to the lower layer and visa versa (e.g., MTU, IP TOS to dot.p, etc.), regarding the way in which faults have an effect between layers (e.g., layer 2 link down, layer 3 unreachable subnet, etc.), and the way performance statistics affect the layers involved in such mapping.

It is appreciated that events and messaging of the distributed network management architecture of FIGS. 1–3 preferably adhere to networking standards. Thus, for example, two DCs on both sides of an interoperable logical link may signal each other the existence of a link failure (e.g., far-end near-end SONET) or agree on a constant configuration parameter (e.g., SONET/SDH VPNC Mask, etc.). Similarly, parameters of an upper layer may be mapped to a lower layer in according with networking standards as deployed in the network elements, such as the way an IP switch chip is wired to an Ethernet MAC chip or the way IP software drives SONET hardware. The combination of such parent-child and acquaintance-acquaintance single-hop discrete message passing between DCs constitutes a powerful multi-layer signaling mechanism that can carry out end-to-end provisioning tasks and can deduce the root cause and the effect of a network condition.

Figure 4:
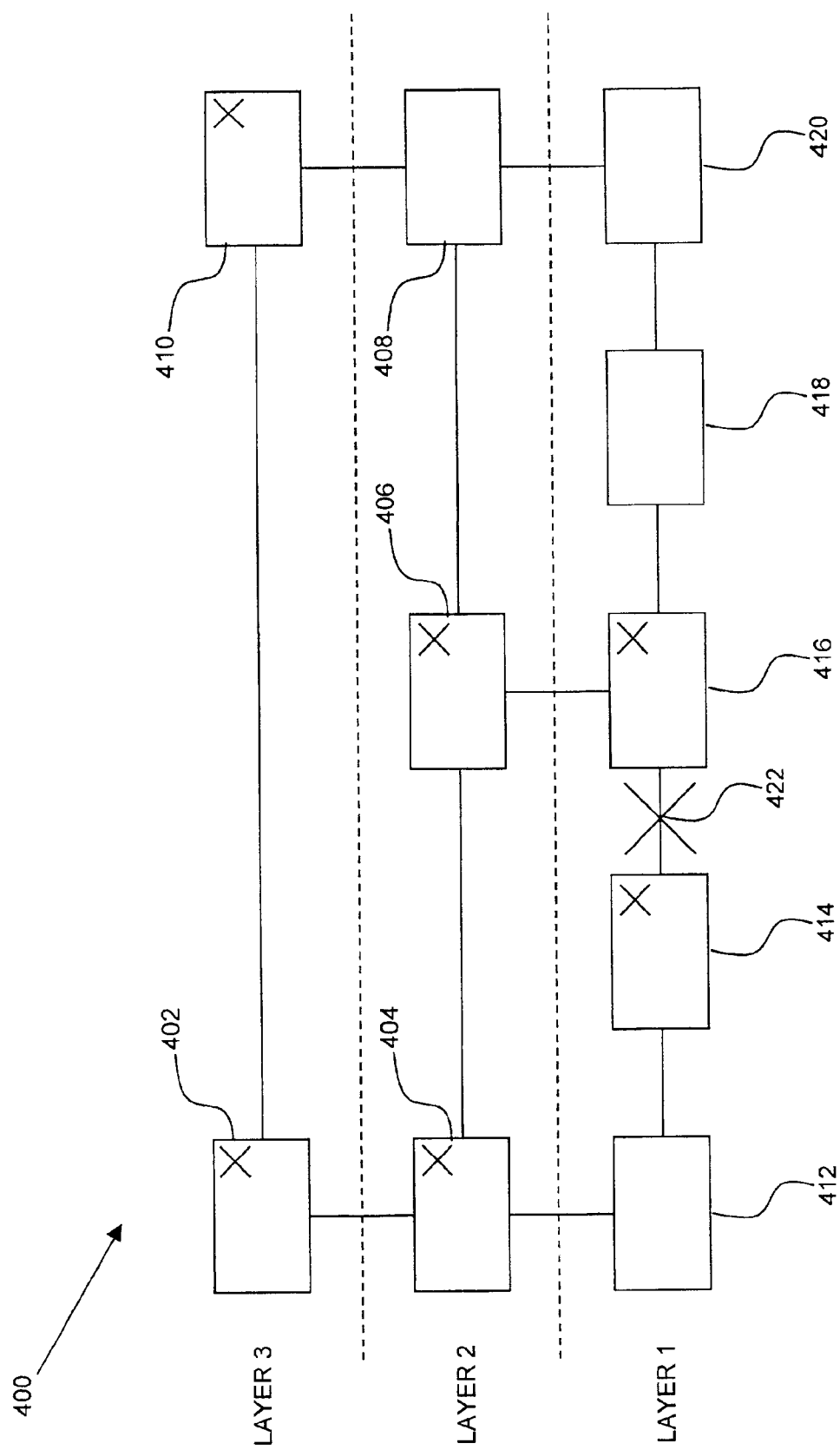
FIG. 4 is a simplified conceptual illustration of a portion of a distributed network management architecture showing a network fault, useful in understanding the present invention.

Reference is now made to FIG. 4, which is a simplified conceptual illustration of a portion of a distributed network management architecture showing a network fault, useful in understanding the present invention. A plurality of DCs 402–420 are shown in FIG. 4, with each DC representing a different area of responsibility within a network, generally designated 400. A fault that occurs within network 400, such as a "port down" error shown at reference numeral 422, is detected at several of the DCs, with each DC detecting the effect of the fault on its area of responsibility. Each affected DC is marked with an "X". The root cause of the fault, however, is typically not known to the DCs. For example, a layer 3 DC might detect an "unreachable host" error or other type of error that is different from the root cause "layer 1 "Port Down"" event, though the detected error may be caused by the root cause event. Furthermore, a DC that detects a fault does not know whether or not its area of responsibility is the root cause of the fault.

The process of analyzing a fault is divided into two phases: 1. Determining the root cause of an event, described in greater detail hereinbelow with reference to FIG. 5, and 2. Identifying those network elements that are affected by the root cause event, described in greater detail hereinbelow with reference to FIG. 6.

Figure 5:
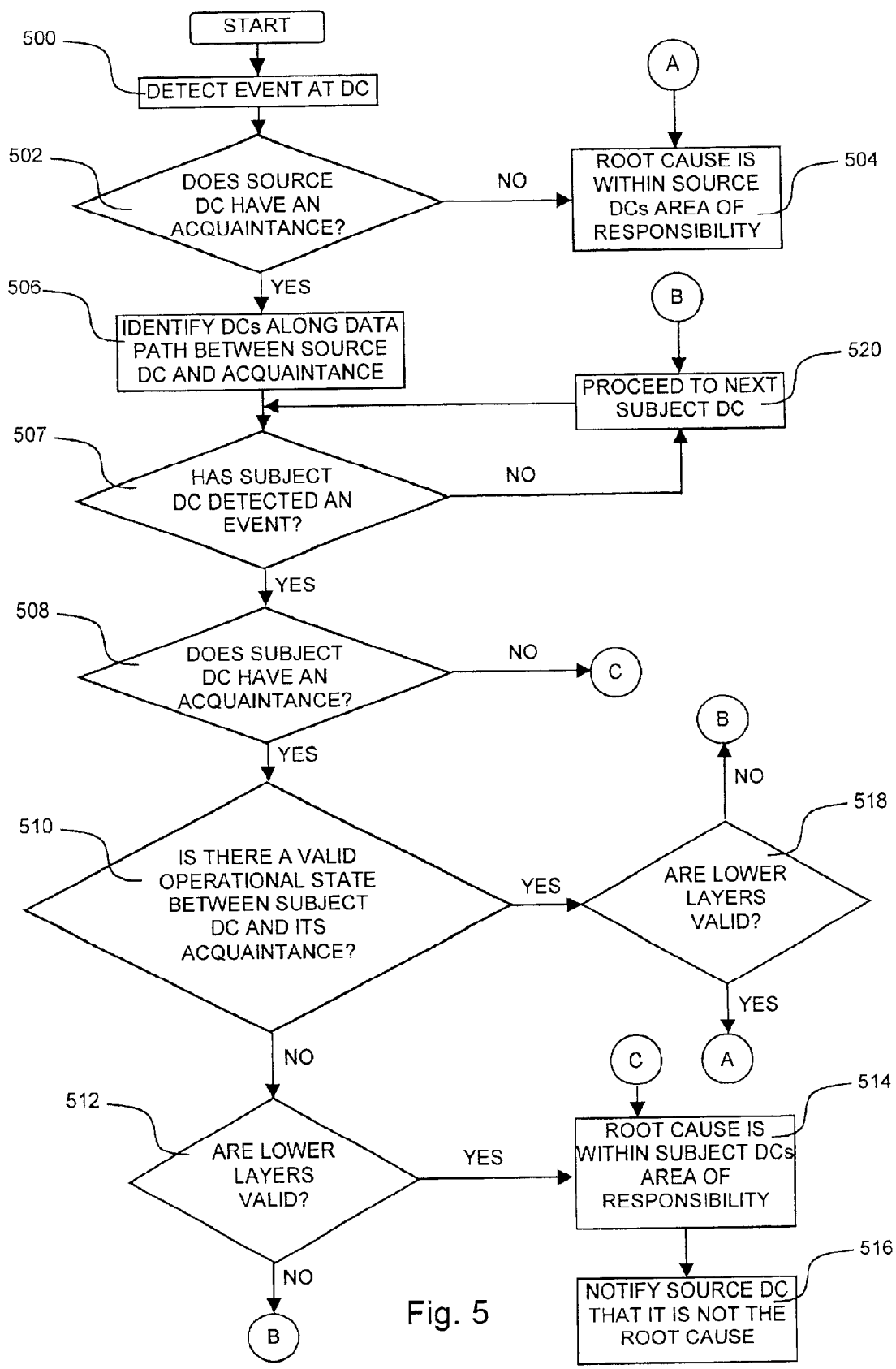
FIG. 5 is a simplified flowchart illustration of a method of determining the root cause of an event in a distributed network management architecture, operative in accordance with a preferred embodiment of the present invention.

Reference is now made to FIG. 5, which is a simplified flowchart illustration of a method of determining the root cause of an event in a distributed network management architecture, operative in accordance with a preferred embodiment of the present invention. In the method of FIG. 5 an event is detected at one or more DCs in the network (step 500). An event may be characterized differently by each different DC according to its area of responsibility. For example, in an ATM network, a layer 1 event might be the detection of a port down, while a layer 2 event might be the detection of a VC down or of cell rate degradation. For each DC which detected an event, if the DC does not have an acquaintance DC (step 502), then the root cause is determined to be within the DCs area of responsibility (step 504). If the DC, now referred to as the source DC, does have an acquaintance, find the data path within the network from the source DC's underlying network element to the acquaintance DC's underlying network element, preferably such that the data path traverses only those network elements at or below the source DC's network layer, and identify those DCs whose area of responsibility lay along the data path (step 506). For each DC in the path, now referred to as a subject DC, if the subject DC has not detected an event (step 507), then proceed to the next subject DC in the path (step 520). Otherwise, if the subject DC has an acquaintance DC (step 508), then check whether there is a valid operational state between their underlying areas of responsibility (step 510). For example, if the subject DC and its acquaintance DC are both layer 1 ports, the operational state between the two ports is said to be valid when both ports are "up" and therefore interoperable. If any subject DC is found not to have a valid operational state with respect to its acquaintance DC then check whether all other subject DCs at lower network layers do have valid operational states with respect to their acquaintance DCs (step 512). If all other subject DCs at lower network layers do have valid operational states with respect to their acquaintance DCs, then the root cause is determined to be within the area of responsibility of the subject DC found not to have a valid operational state with respect to its acquaintance DC (step 514), and the source DC is notified that it is not the root cause DC (step 516). Otherwise, proceed to the next subject DC (step 520). If, at step 508, the subject DC does not have an acquaintance DC, then the root cause is determined to be within the area of responsibility of the subject DC (step 514). If no invalid data flows are found along the path between the source DC and its acquaintance DC (step 518), then the root cause is provisionally determined to be within the source DCs area of responsibility (step 504), otherwise, proceed to the next subject DC (step 520). Where a source DC has more than one acquaintance, steps 506–520 are preferably performed for each if its acquaintances. If a source DC is not identified as a root cause DC while performing steps 506–520 for any of its acquaintances, then the root cause is determined not to be within the source DCs area of responsibility. If, however, a source DC is provisionally identified as a root cause DC each time steps 506–520 are performed for each of its acquaintances, or if the source DC has only one acquaintance, then the root cause is determined to be within the source DCs area of responsibility.

Figure 6:
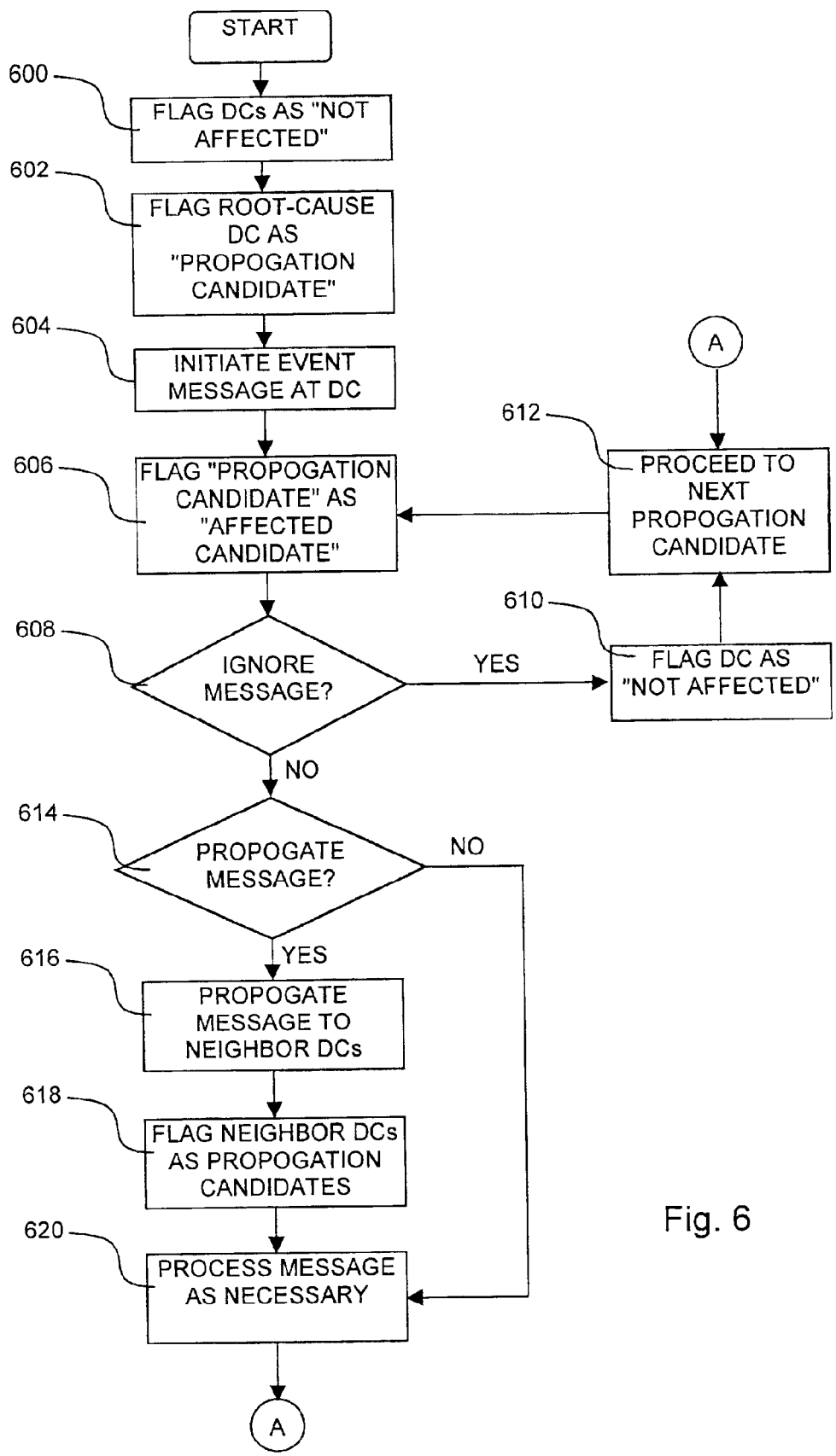
FIG. 6 is a simplified flowchart illustration of a method of identifying network elements that are affected by a root cause event in a distributed network management architecture, operative in accordance with a preferred embodiment of the present invention.

Reference is now made to FIG. 6, which is a simplified flowchart illustration of a method of identifying network elements that are affected by a root cause event in a distributed network management architecture, operative in accordance with a preferred embodiment of the present invention. In the method of FIG. 6, once the DC or DCs have been identified in whose area of responsibility the root cause event occurred, all DC's are flagged as "not affected" by the root cause event (step 600). Where two DCs have been identified in whose area of responsibility the root cause event occurred (e.g., two DCs on either side of a down link), the two DCs preferably jointly decide which of the two DCs shall, for the purpose of carrying out the method of FIG. 6, be the "sole" root cause DC. Thus, the sole DC in whose area of responsibility the root cause event occurred is then flagged as a "propagation candidate" (step 602). As the root cause DC it typically initiates a message specific to the root cause event (step 604). For example, if the root cause DC identified a "port down" event, it may generate a "port down" message. For each DC flagged as a propagation candidate, flag the DC as an "affected candidate" (step 606). The DC flagged as an affected candidate is then evaluated to determine how the DC is supposed to react to the root cause event or transformation thereof (e.g., a "port down" message received by an ATM DC will be "transformed" into one or more "VC down" messages reported to higher-layer DCs). If the DC flagged as an affected candidate should ignore the message (step 608) then flag the DC as "not affected" (step 610) and proceed to evaluate the next DC flagged as a propagation candidate (steps 612, 606). If the DC flagged as an affected candidate is required to propagate the event message or a transformation thereof to one or more neighboring DCs (step 614), then propagate the event message or its transformation to those neighbor DCs as required (step 616) and flag these neighbor DCs as propagation candidates (step 618). The DC may also process the message as necessary to determine what action or actions other than propagation should be taken, such as halting transmissions, increasing buffer sizes, etc. (step 620). The next DC flagged as a propagation candidate is then evaluated (steps 612, 606). If after step 614 the DC flagged as an affected candidate is not required to propagate the event message or a transformation thereof to a neighbor DC, then the DC may process the message as necessary to determine what action or actions other than propagation should be taken (step 620), and the next DC flagged as a propagation candidate is then evaluated (steps 612, 606). Steps 606–620 are repeated as necessary until all DCs flagged as propagation candidates during all iterations have been evaluated. All DCs flagged as affected candidate represent those aspects of the network that are affected by the root cause event.

It is appreciated that one or more of the steps of any of the methods described herein may be omitted or carried out in a different order than that shown, without departing from the true spirit and scope of the invention.

While the present invention as disclosed herein may or may not have been described with reference to specific hardware or software, the present invention has been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method of determining the root cause of an event in a computer network having a distributed network management architecture, the method comprising:

detecting an event at at least one device component (DC) in said network;

for each source DC at which an event is detected, finding a data path within said network from the source DC's underlying network element to that of its acquaintance DC where present; and identifying as the root cause any of said source DCs and any subject DCs in said data path that have detected an event and either of a) do not have an acquaintance and b) do not have a valid operational state with respect to its acquaintance whereas all other DCs along the data path at lower network layers than the source or subject DC have valid operational states with respect to their acquaintances.

2. In a computer network comprising a plurality of network elements and a network management architecture comprising a plurality of agents, each of the agents corresponding to a different one of the network elements, and a plurality of device components (DC), each of the device components modeling at least one aspect of one of the network elements, the aspect being either of a physical and a functional characteristic of the network element, wherein each of the agents comprises a plurality of the device components, and wherein at least of the two device components within at least one of the agents are logically interconnected, each logical interconnection corresponding to either of a physical and a functional interconnection found within or between any of the network elements, a method of determining the root cause of an event in the distributed network management architecture, the method comprising the steps of:

detecting an event at at least one DC in said network;
for each DC at which an event is detected, said DC now referred to as a source DC:
  if said source DC does not have an acquaintance DC, determining the root cause of said event to be within said source DCs area of responsibility;
  if said source DC does have an acquaintance DC:
    finding a data path within said network from said source DC's underlying network element to said acquaintance DC's underlying network element;
    identifying those DCs whose area of responsibility lay along said data path;
    for each DC in said data path, now referred to as a subject DC:
      if an event is detected at said subject DC:
        if said subject DC has an acquaintance DC:
          if said subject DC does not have a valid operational state with respect to its acquaintance DC:
            if all other DCs along said data path at lower network layers than said subject DC have valid operational states with respect to their acquaintance DCs, determining the root cause of said event to be within the area of responsibility of said subject DC;
          if said subject DC has a valid operational state with respect to its acquaintance DC:
            if all other DCs along said data path at lower network layers than said subject DC have valid operational states with respect to their acquaintance DCs, determining the root cause of said event to be within the area of responsibility of said source DC; and
        if said subject DC does not have an acquaintance DC, determining the root cause of said event to be within the area of responsibility of said subject DC.

3. A method according to claim 2 wherein said finding a data path step comprises traversing only those network elements at or below the network layer of said source DC.

4. A method of determining the root cause of an event in a computer network having a distributed network management architecture, the method comprising the steps of:
detecting an event at at least one device component (DC) in said network;
for each DC at which an event is detected, said DC now referred to as a source DC:
  if said source DC does not have an acquaintance DC, determining the root cause of said event to be within said source DCs area of responsibility:
  if said source DC does have an acquaintance DC:
    finding a data path within said network from said source DC's underlying network element to said acquaintance DC's underlying network element;
    identifying those DCs whose area of responsibility lay along said data path;
    for each DC in said data path, now referred to as a subject DC:
      if an event is detected at said subject DC:
        if said subject DC has an acquaintance DC:
          if said subject DC does not have a valid operational state with respect to its acquaintance DC:
            if all other DCs along said data path at lower network layers than said subject DC have valid operational states with respect to their acquaintance DCs, determining the root cause of said event to be within the area of responsibility of said subject DC;
          if said subject DC has a valid operational state with respect to its acquaintance DC:
            if all other DCs along said data path at lower network layers than said subject DC have valid operational states with respect to their acquaintance DCs, determining the root cause of said event to be within the area of responsibility of said source DC; and
        if said subject DC does not have an acquaintance DC, determining the root cause of said event to be within the area of responsibility of said subject DC.

5. A method according to claim 4 wherein said finding a data path step comprises traversing only those network elements at or below the network layer of said source DC.

6. In a computer network comprising a plurality of network elements and a network management architecture comprising a plurality of agents, each of the agents corresponding to a different one of the network elements, and a plurality of device components (DC), each of the device components modeling at least one aspect of one of the network elements, the aspect being either of a physical and a functional characteristic of the network element, wherein each of the agents comprises a plurality of the device components, and wherein at least of the two device components within at least one of the agents are logically interconnected, each logical interconnection corresponding to either of a physical and a functional interconnection found within or between any of the network elements, a method of identifying network elements that are affected by a root cause event in the distributed network management architecture, the method comprising the steps of:

identifying at least one DC in whose area of responsibility a root cause event occurred;
flagging all of said DCs as "not affected" by said root cause event;
flagging said DC in whose area of responsibility a root cause event occurred as a "propagation candidate";
initiating a message specific to the root cause event;
for each DC flagged as a propagation candidate:
  flagging said DC flagged as a propagation candidate as an "affected candidate";
  if the DC flagged as an affected candidate should ignore said message, flagging said DC flagged as an affected candidate as "not affected";
  if the DC flagged as an affected candidate is required to propagate said message or a transformation thereof to at least one neighbor DC:
    propagating the message or a transformation thereof to said neighbor DCs; and
    flagging said neighbor DCs as "propagation candidates",
wherein said DCs flagged as an affected candidate represent those network elements that are affected by said root cause event.

7. A method according to claim 6 wherein said for each DC steps are repeated for all DCs flagged as propagation candidates during a plurality of iterations.

8. A method according to claim 6 wherein said for each DC steps further comprises any of said DCs performing an action responsive to said message.

9. A method of identifying network elements that are affected by a root cause event in a computer network having a distributed network management architecture, the method comprising the steps of:

identifying at least one device component (DC) in whose area of responsibility a root cause event occurred;

flagging all of said DCs as "not affected" by said root cause event;

flagging said DC in whose area of responsibility a root cause event occurred as a "propagation candidate";

initiating a message specific to the root cause event;

for each DC flagged as a propagation candidate:

flagging said DC flagged as a propagation candidate as an "affected candidate";

if the DC flagged as an affected candidate should ignore said message, flagging said DC flagged as an affected candidate as "not affected";

if the DC flagged as an affected candidate is required to propagate said message or a transformation thereof to at least one neighbor DC:

propagating the message or a transformation thereof to said neighbor DCs; and flagging said neighbor DCs as "propagation candidates", wherein said DCs flagged as an affected candidate represent those network elements that are affected by said root cause event.

10. A method according to claim 9 wherein said for each DC steps are repeated for all DCs flagged as propagation candidates during a plurality of iterations.

11. A method according to claim 9 wherein said for each DC steps further comprises any of said DCs performing an action responsive to said message.

* * * * *